United States Patent [19]

Mense

[11] Patent Number: 4,793,657

[45] Date of Patent: Dec. 27, 1988

[54] SUCTION DEVICE FOR TAKING-UP AND DEPOSITING OF WORK PIECES

[75] Inventor: Lorenz Mense, Hamburg, Fed. Rep. of Germany

[73] Assignee: Messerschmitt-Boelkow-Blohm Gesellschaft mit beschraenkter Haftung, Munich, Fed. Rep. of Germany

[21] Appl. No.: 92,042

[22] Filed: Sep. 1, 1987

[30] Foreign Application Priority Data

Sep. 3, 1986 [DE] Fed. Rep. of Germany ....... 3629968

[51] Int. Cl.⁴ ............................. B25J 15/06; B66C 1/02
[52] U.S. Cl. ............................................. 294/65; 271/91; 414/121
[58] Field of Search ................. 294/64.1, 65; 221/211; 248/362, 363; 269/21; 271/90, 91, 103; 414/121, 627, 737, 744 B, 752; 901/40

[56] References Cited

U.S. PATENT DOCUMENTS

| | | | |
|---|---|---|---|
| 1,060,948 | 5/1913 | Schuster | 294/65 X |
| 2,665,013 | 1/1954 | Socke | 294/64.1 X |
| 3,591,228 | 7/1971 | Webb | 294/65 |
| 3,697,112 | 10/1972 | Neilson et al. | 294/65 |
| 4,266,905 | 5/1981 | Birk et al. | 294/64.1 X |
| 4,452,557 | 6/1984 | Bouwknegt et al. | 294/64.1 X |
| 4,561,687 | 12/1985 | Bostrom | 294/64.1 |

FOREIGN PATENT DOCUMENTS

| | | | |
|---|---|---|---|
| 120291 | 10/1984 | European Pat. Off. | 294/64.1 |
| 753771 | 8/1980 | U.S.S.R. | 294/64.1 |
| 946921 | 7/1982 | U.S.S.R. | 294/64.1 |
| 1041287 | 9/1983 | U.S.S.R. | 294/64.1 |

Primary Examiner—Johnny D. Cherry
Attorney, Agent, or Firm—W. G. Fasse; D. H. Kane, Jr.

[57] ABSTRACT

A suction device for taking-up, transporting, and depositing work pieces, such as flat blanks of limp sheet material or panels, is equipped with a plurality of suction tubes. Each suction tube is individually connectable to a source of reduced pressure, whereby a pattern of effective suction tubes may be conformed to any particular configuration of a blank. The tubes are arranged in a housing, for example, in rows and columns. At least a portion of the housing is formed as a reduced pressure chamber. Each tube is individually connectable to the reduced pressure chamber to make the respective tube effective. Disconnection makes the tube ineffective. The connection of disconnection simultaneously moves the respective tube into a work position or into a rest position.

10 Claims, 3 Drawing Sheets

SUCTION DEVICE FOR TAKING-UP AND DEPOSITING OF WORK PIECES

FIELD OF THE INVENTION

The invention relates to a suction device for taking-up, transporting, and depositing of work pieces, especially flat work pieces, such as blanks of prepreg materials, fabrics, films, foils, or panel blanks.

DESCRIPTION OF THE PRIOR ART

Suction devices of the type mentioned above are used in different manufacturing operations as a tool for lifting, transporting, and depositing of blanks that are difficult to handle manually. Many different versions of such suction devices are known in the art. However, practical experience has shown that such suction device tools cause certain problems, especially in connection with an automated mass production where the tool is attached to a roboter and especially where blanks of different sizes and shapes must be handled. Frequently more than one blank is lifted or the blanks in a stack are shifted out of proper alignment in the stack. Further, in conventional devices of this type it is possible that a loss of reduced pressure cannot be avoided where the shape of a blank does not conform to the configuration or pattern of the suction tubes.

OBJECTS OF THE INVENTION

In view of the foregoing it is the aim of the invention to achieve the following objects singly or in combination:

to improve a suction device of the type mentioned above in such a way that with little effort and expense the above problems are avoided;

to make the configuration of a plurality of suction tubes selectively and easily adaptable to the configuration or pattern of a work piece to avoid a loss of reduced pressure; and to control the selection of the suction pipes that are exposed to reduced pressure and those which are not supposed to be exposed to reduced pressure by a central processing unit.

SUMMARY OF THE INVENTION

A suction device according to the invention is characterized by the arrangement of a plurality of suction pipes in a predetermined pattern in a housing so that each suction pipe is individually controllable for the application of suction or for removal of the suction from any one of the suction pipes. Preferably, the pipes are arranged in a raster type or matrix type configuration.

Thus, a set up and a change of the set up of the configuration formed by the suction pipes can be made easily while taking into account the size, shape, and weight of the individual work piece blanks. Such changes can be made rapidly and individually, whereby the spacing between effective suction openings and the number of effective openings may be selected as required.

An advantageous embodiment of the invention may be realized with a minimal effort and expense for the control means by making each individual suction pipe adjustable in its elevational position within the housing, wherein the pressure of a biasing spring keeps each suction pipe or tub individually in a withdrawn position in which it cannot be charged with reduced pressure, and wherein an electromagnet individually provided for each suction tube, pushes its respective tube into an operative position in which one end of the tube is exposed to a reduced pressure while the other end forms a suction end that may be equipped with a suction cup. In the rest position in which reduced pressure cannot be applied to the one end of the suction tube, the one end rests against a seal in a reduce pressure chamber of the housing while in the operating or working position the one tube end is removed from the seal so that the reduced pressure may be applied to the suction tube. The seals may be provided individually for each tube or the entire wall of the reduced pressure chamber may be provided with a seal. Such seal or seals may be provided in the form of a rubber disk or rubber sheet against which the edge of the one end of each tube rests in the inoperative position.

Providing the suction ends of the tubes with suction cups is especially effective where the device is used for lifting, transporting and depositing of relatively stiff rigid work pieces such as panels of synthetic material, glass plates and the like.

By using a central processing unit or computer for the selection of the suction pipes that are to be effective, it is easily possible to repeatedly modify the pattern formed by the effective suction tubes or pipes in accordance with the geometry or size or weight of the respective work piece blank.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
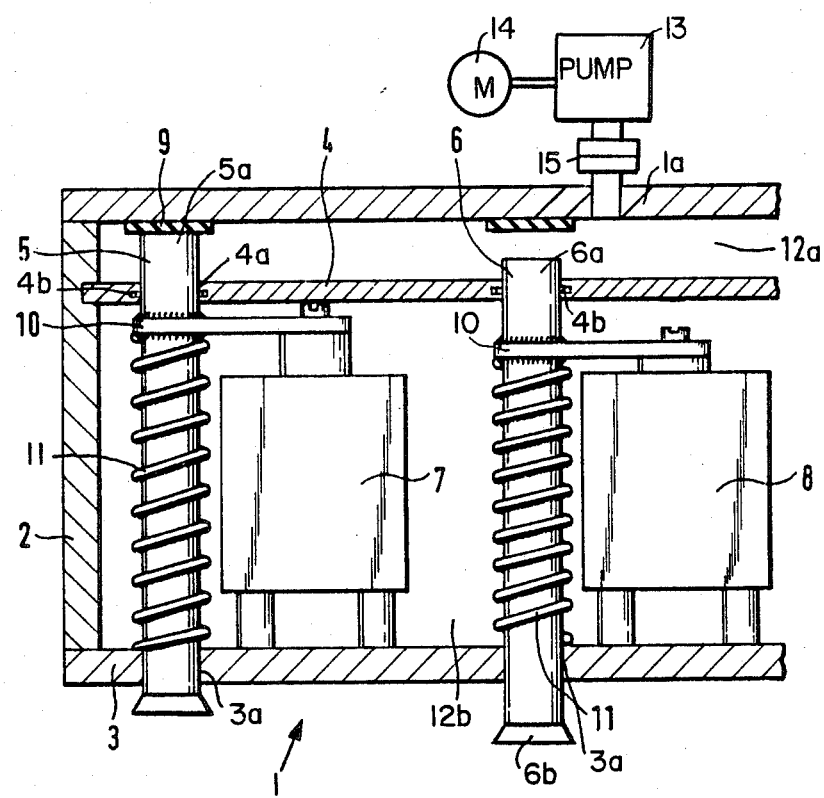
FIG. 1 is a sectional view through a portion of a suction device according to the invention showing one suction pipe in its inoperative position and another suction pipe in its operative position.
Figure 2:
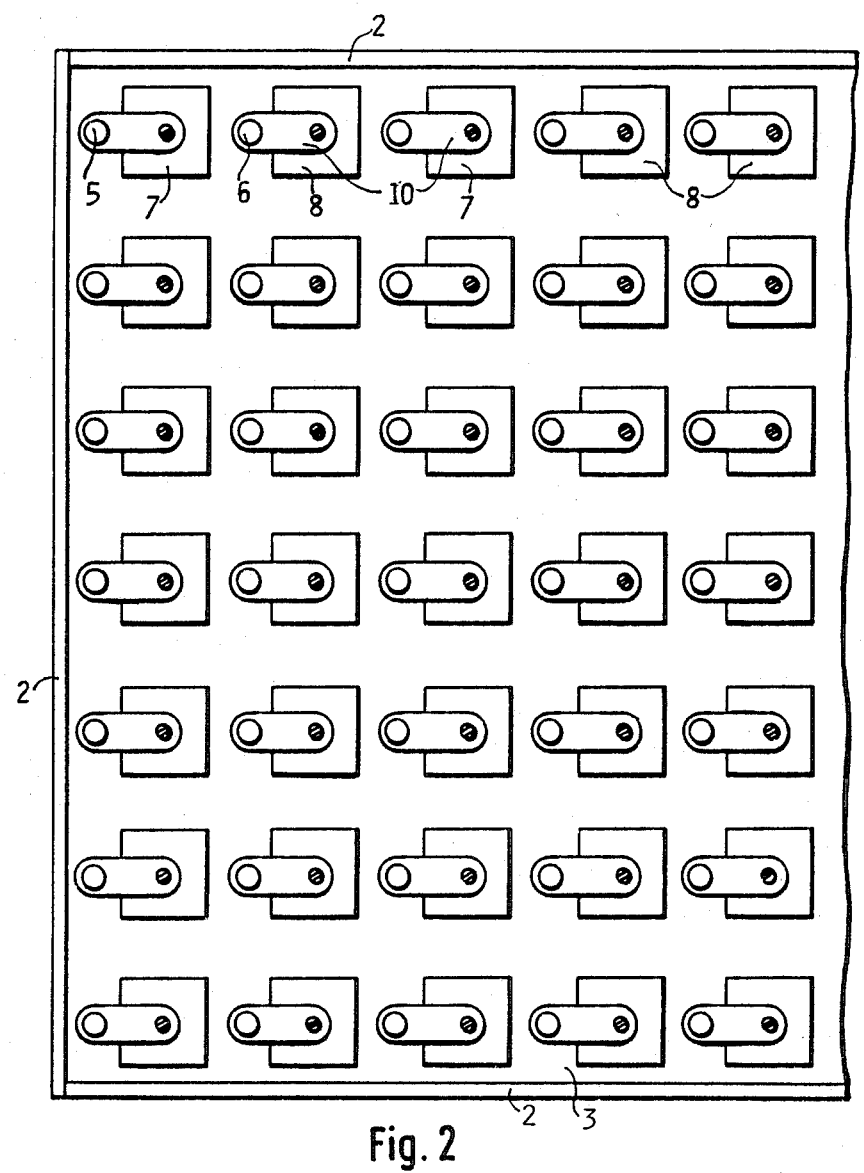
FIG. 2 is a top plan view onto a group of suction tubes with their individual drive electromagnets arranged in a raster o matrix pattern.

Referring to FIGS. 1 and 2, the present suction device includes a housing 1 formed by side walls 2, a bottom 3, and a cover 1a. The inner space of the housing 1 is divided by a separation wall 4 into a reduced pressure chamber 12a and a mounting chamber 12b.

The pressure in the reduced pressure chamber 12a can be reduced by a vacuum pump 13 driven by a motor 14 and coupled to the chamber 12a by a coupling device 15 such as a conventional quick coupler. The bottom 3 is provided with holes 3a located in axial alignment with respective holes 4a in the separation wall 4. Seals 4b are provided in the separation wall 4 around the holes 4a. These seals help maintaining the reduced pressure in the chamber 12a. A plurality of suction pipes or tubes 5 and 6 are mounted for sliding movement in the axial direction in the holes 3a, 4a. The suction tubes 5 are shown in an inoperative rest position in which reduced pressure cannot be applied to the tubes 5. The tubes 6 are shown in an operative position in which reduced pressure is applied through one end 6a to the respective suction pipe in the chamber 12a.

As best seen in FIG. 2, all the suction pipes are arranged in a raster type or matrix type arrangement in rows and columns. However, the invention is not limited to such an arrangement of the suction pipes. For example, the suction pipes could be arranged in concentric circles or in any other suitable distribution pattern.

In the rest position of the suction pipes 5 the upper end 5a is pressed against a seal 9 by a biasing spring 11 so that the reduced pressure in the chamber 12a cannot be effective in the suction pipes 5. When the suction pipes 5 are moved into the position of tubes 6, the reduced pressure is effective in the suction pipes or tubes.

Each suction pipe is operated by an electromagnet such as a lifting magnet 7 or 8. The magnets 7 are not energized, whereby the biasing spring 11 is effective as described above. The electromagnets 8 are energized and thereby push the respective suction tubes 6 downwardly so that the upper end 6a is exposed to the reduced pressure and so that the lower end with its suction cup 6b can contact the work piece (not shown).

Figure 3:
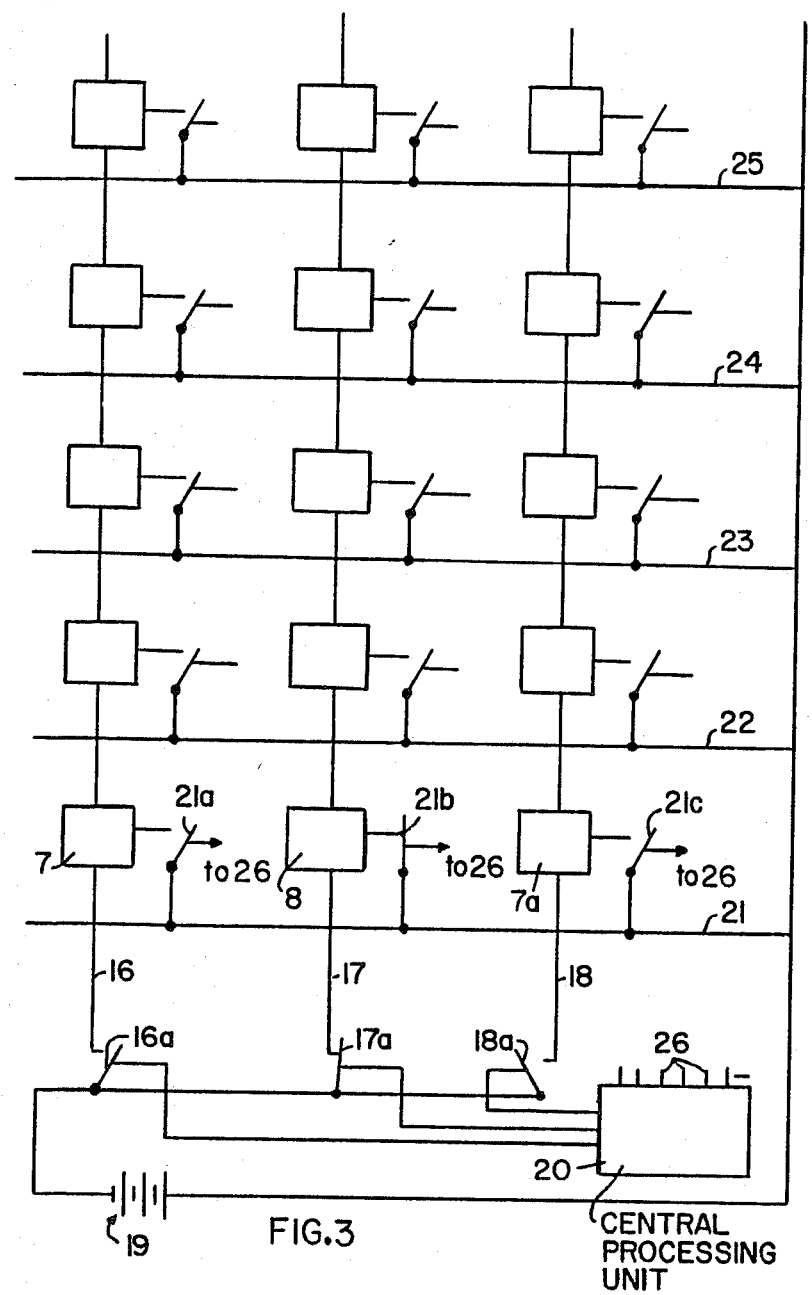
FIG. 3 shows a control circuit for individually energizing the electromagnets with the aid of a central processing unit.

FIG. 3 shows a control circuit for the individual electromagnets arranged in rows and columns in the energizing circuit. Each column circuit branch 16, 17, and 18 is connectable to a source of power 19 by respective column switches 16a, 17a, and 18a. The switches are controlled for their opening and closing by a central processing unit 20. One end of each energizing coil of the magnets 7, 8 is connected to the respective common column power supply conductor. The other end of the respective coil is connectable to the other terminal of the power supply through an individual row switch and the respective row power supply conductors 21, 22, 23, 24, and 25. Thus, the magnet 7 has an individual energizing switch 21a, the magnet 8 has a switch 21b, and the magnet 7a has a switch 21c. These switches are connected to the row power supply line 21. If desired, the column supply conductor 17 may also be provided with individual switches for each magnet energizing coil in the same way as shown for the rows by the row switches.

As shown, all the switches are open, except for the switches 17a and 21b. Thus, only the magnet 8 is energized holding its respective suction tube 6 in the position shown in FIG. 1. The row switches 21a, 21b, 21c and so forth are connected to control outputs 26 of the central processing unit 20 for opening or closing the switches in accordance with preselected patterns. Although the switches are shown as simple contacts, they may be transistors or any other suitable electronic switches.

In FIG. 3 the energizing coils of the lifting magnets are all connectable in parallel to the column conductors and thus in parallel to the power supply 19 through the respective row switch and row conductor.

Although the invention has been described with reference to specific example embodiments, it will be appreciated that it is intended to cover all modifications and equivalents within the scope of the appended claims.

What I claim is:
1. A suction device for taking-up and depositing work pieces comprising a plurality of suction tubes, housing means for holding said suction tubes in a predetermined pattern for movement between an operative suction applying position and an inoperative rest position, and drive means in said housing means for individually connecting one end of each of said suction tubes to a source of vacuum or reduced pressure.

2. The suction device of claim 1, wherein said predetermined pattern comprises rows and columns of said suction tubes arranged in a raster or matrix pattern.

3. The suction device of claim 1, wherein said housing means comprise wall means for forming a reduced pressure chamber and a mounting chamber for said suction tubes and said drive means, said wall means having a first wall separating said reduced pressure chamber from said mounting chamber, and a second wall for enclosing said mounting chamber, mounting holes in said first and second walls, said mounting holes being axially aligned in pairs so that each suction tube is slidably held in its respective pair of mounting holes to reach with said one end into said reduced pressure chamber and with a suction end out of said mounting chamber, said drive means comprising individual electromagnets mounted in said mounting chamber, spring means arranged for normally biasing said suction tubes individually into said inoperative rest position, and means connecting each suction tube individually to its respective electromagnet for moving each suction tube against the force of the biasing spring means out of said inoperative rest position into said operative suction applying position in which said one end of the respective suction tube is exposed to reduced pressure in said reduced pressure chamber.

4. The suction device of claim 3, further comprising sealing means in said reduced pressure chamber, said spring means urging said suction tubes against said sealing means in said inoperative rest position.

5. The suction device of claim 3, further comprising sealing means arranged in said first wall to surround said suction tubes slidably passing through said mounting holes in said first wall for sealing said reduced pressure chamber from said mounting chamber.

6. The suction device of claim 1, wherein each suction tube comprises a suction cup attached to a suction end of the respective suction tube.

7. The suction device of claim 1, further comprising control circuit means including compute means for energizing said drive means in any desired combination of suction tubes, whereby a group of suction tubes may be activated in accordance with data relating to a particular work piece.

8. The suction device of claim 7, wherein said data represent a geometrical configuration of said work piece.

9. The suction device of claim 7, wherein said data represent the weight of said work piece.

10. The suction device of claim 7, wherein said control circuit means comprise a matrix circuit, wherein said drive means comprising an electromagnet for each individual suction tube, said electromagnets being connected to crossing points in said matrix circuit, power supply means for energizing said electromagnets, switch means arranged for individually connecting said electromagnets to said power supply means, and a central processing unit connected for controlling said switch means in accordance with input data taking a work piece characteristic into account for selecting electromagnets to be energized.

* * * * *